United States Patent
Tough

(10) Patent No.: US 10,352,483 B2
(45) Date of Patent: Jul. 16, 2019

(54) IRRIGATION PIPE COMPRISING AXIALLY EXTENDING LOAD BEARING MEMBERS

(71) Applicant: Netafim, Ltd., Tel Aviv (IL)

(72) Inventor: David Tough, Tayport Fife (GB)

(73) Assignee: Netafim, Ltd., Tel Aviv (IL)

( * ) Notice: Subject to any disclaimer, the term of this patent is extended or adjusted under 35 U.S.C. 154(b) by 63 days.

(21) Appl. No.: 15/575,070

(22) PCT Filed: May 3, 2016

(86) PCT No.: PCT/IB2016/052500
§ 371 (c)(1),
(2) Date: Nov. 17, 2017

(87) PCT Pub. No.: WO2016/185308
PCT Pub. Date: Nov. 24, 2016

(65) Prior Publication Data
US 2018/0149293 A1    May 31, 2018

Related U.S. Application Data

(60) Provisional application No. 62/164,336, filed on May 20, 2015.

(51) Int. Cl.
*F16L 11/08* (2006.01)
*B32B 5/02* (2006.01)
(Continued)

(52) U.S. Cl.
CPC .............. *F16L 11/086* (2013.01); *B32B 1/08* (2013.01); *B32B 3/04* (2013.01); *B32B 5/024* (2013.01); *B32B 5/12* (2013.01); *B32B 5/26* (2013.01); *B32B 27/08* (2013.01); *B32B 27/12* (2013.01); *B32B 27/18* (2013.01); *B32B 27/304* (2013.01); *B32B 27/32* (2013.01); *B32B 27/325* (2013.01); *B32B 27/327* (2013.01); *F16L 11/042* (2013.01); *F16L 11/085* (2013.01);
(Continued)

(58) Field of Classification Search
CPC ..... F16L 11/02; F16L 9/16; F16L 9/17; F16L 11/042; F16L 11/085; F16L 11/088; Y10T 428/1366
USPC ................................ 138/123–126, 137, 140
See application file for complete search history.

(56) References Cited

U.S. PATENT DOCUMENTS 3,850,203 A * 11/1974 Shobert .............. B01D 46/0001
138/103
3,881,522 A    5/1975 Lewis et al.
(Continued)

OTHER PUBLICATIONS

International Search Report dated Aug. 17, 2016, in counterpart International (PCT) Application No. PCT/IB2016/052500.
(Continued)

*Primary Examiner* — Patrick F Brinson
(74) *Attorney, Agent, or Firm* — Womble Bond Dickinson (US) LLP

(57) ABSTRACT

An irrigation pipe is formed from a sheet rolled into a tube about a longitudinal axis, and having overlapped lateral margins. The sheet has a fabric layer and an outer layer formed on the fabric layer. The pipe includes axially extending load bearing members which are in contact with the outer layer. The load bearing members are lacking at least in the vicinity of one or both of the overlapped lateral margins.

23 Claims, 3 Drawing Sheets

(51) Int. Cl.
  *B32B 5/12* (2006.01)
  *B32B 5/26* (2006.01)
  *B32B 27/08* (2006.01)
  *B32B 27/12* (2006.01)
  *B32B 27/32* (2006.01)
  *B32B 1/08* (2006.01)
  *F16L 11/04* (2006.01)
  *B32B 27/18* (2006.01)
  *B32B 27/30* (2006.01)
  *B32B 3/04* (2006.01)

(52) U.S. Cl.
  CPC ......... *F16L 11/088* (2013.01); *B32B 2250/03* (2013.01); *B32B 2250/242* (2013.01); *B32B 2255/02* (2013.01); *B32B 2255/26* (2013.01); *B32B 2260/021* (2013.01); *B32B 2260/023* (2013.01); *B32B 2260/046* (2013.01); *B32B 2262/0253* (2013.01); *B32B 2262/101* (2013.01); *B32B 2274/00* (2013.01); *B32B 2307/54* (2013.01); *B32B 2307/5825* (2013.01); *B32B 2307/734* (2013.01); *B32B 2405/00* (2013.01); *B32B 2410/00* (2013.01); *B32B 2597/00* (2013.01)

(56) References Cited

U.S. PATENT DOCUMENTS

| 3,945,867 | A  | * | 3/1976  | Heller, Jr. | ............ | B29D 23/001 |
|           |    |   |         |             |              | 156/143     |
| 7,600,537 | B2 | * | 10/2009 | Bhatnagar   | ................ | B32B 1/08 |
|           |    |   |         |             |              | 138/137     |
| 7,886,775 | B2 | * | 2/2011  | Masarwa     | .................. | F16L 9/16 |
|           |    |   |         |             |              | 138/123     |
| 2002/0162597 | A1 |   | 11/2002 | Radlinger et al. | | |
| 2003/0201345 | A1 | * | 10/2003 | Jeong    | ...................... | A01G 25/02 |
|           |    |   |         |             |              | 239/542     |
| 2004/0154676 | A1 | * | 8/2004  | Wilkinson | ............ | F16L 11/086 |
|           |    |   |         |             |              | 138/125     |
| 2005/0109414 | A1 | * | 5/2005  | Jeong     | .................... | F16L 11/042 |
|           |    |   |         |             |              | 138/123     |
| 2007/0074776 | A1 | * | 4/2007  | Masarwa   | .................. | F16L 9/17 |
|           |    |   |         |             |              | 138/124     |
| 2008/0251152 | A1 | * | 10/2008 | Masarwa   | .................. | F16L 9/16 |
|           |    |   |         |             |              | 138/125     |

OTHER PUBLICATIONS

Written Opinion dated Aug. 17, 2016, in counterpart International (PCT) Application No. PCT/IB2016/052500.

* cited by examiner

IRRIGATION PIPE COMPRISING AXIALLY EXTENDING LOAD BEARING MEMBERS

RELATED APPLICATIONS

This is a 35 USC 371 U.S. National Phase of International Application No. PCT/M2016/052500 filed 3 May 2016 and published in English as WO 2016/185308A1 on 24 Nov. 2016, which claims priority to U.S. Provisional application No. 62/164,336, filed 20 May 2015. The contents of the aforementioned applications are incorporated by reference in their entirety.

TECHNICAL FIELD

Embodiments of the invention relate to an irrigation pipe, and more specifically to multilayer irrigation pipes.

BACKGROUND

Flexible pipes for transporting liquids that are reinforced With fibers are known and are used for such varied purposes as fire hoses, hydraulic hoses and irrigation pipes. The pipes generally have a multilayer construction in which a preformed pipe body comprising a flexible substrate material such as a suitable polymer, is bonded to at least one layer of fabric or layer comprising a mesh of natural or artificial fibers.

The reinforcing fibers provide the pipes with enhanced tear resistance, durability and generally improved structural integrity and resistance to stress generated by pressure of the liquids the pipes transport. Stresses generated by pressure of liquid on a wall containing the liquid may be defined as longitudinal stress, hoop stress and radial stress. Longitudinal stress is parallel to an axis along the length of a pipe and typically causes a pipe to stretch and lengthen. Hoop stress is stress that operates to stretch material in the pipe wall circumferentially relative to the pipe axis. Radial stress operates radially to push the pipe wall outward from the axis.

The number and types of layers and/or sets of fibers in a given pipe and their respective angles are configured to provide the pipe with desired ability to withstand the various stresses to which the pipe is expected to be subjected in its intended use. For some applications, one set of fibers runs lengthwise along the pipe, parallel to the pipe axis, with a second set of fibers oriented substantially perpendicular to the pipe axis.

For some pipes it is desired that change in length of the pipe generated by changes in pressure of liquid in the pipe be minimized. For such pipes, the reinforcing fibers may be oriented at a bias angle, referred to as a "neutral bias angle". Typically, the pipe comprises at least one set of fibers oriented at a positive neutral bias angle with respect to the pipe axis that crisscrosses over at least one second set of fibers oriented at a negative neutral bias angle with respect to the pipe axis. U.S. Pat. No. 7,886,775 describes a pipe that makes use of fibers oriented at a neutral bias angle.

Whereas any strain in a pipe resulting from liquid pressure stress can be problematic in a given application, for long flexible pipes that are often used for agricultural irrigation, longitudinal stress and resultant longitudinal strain, i.e. elongation, can be particularly bothersome. A total longitudinal strain by which a pipe elongates when subject to a given longitudinal stress is proportional to the length of the pipe. The longer the pipe, the more a total amount by which it lengthens for a given magnitude of longitudinal stress.

Irrigation pipes typically have irrigation accessories such as emitters and/or various fittings in or attached to the pipes, for releasing water from the pipes to plants for which the pipe is used to provide irrigation or for distributing the water to other irrigation pipes, conventionally referred to as "laterals". The pipes and emitters are generally carefully positioned relative to the plants to which the pipes provide water and emission of water via the emitters is generally carefully controlled. For flexible agricultural pipes, lengthening can cause the pipe to "snake" or curl and hamper water flow from the irrigation accessories as well as substantially to displace the irrigation accessories from their intended positions.

SUMMARY

The following embodiments and aspects thereof are described and illustrated in conjunction with systems, tools and methods which are meant to be exemplary and illustrative, not limiting in scope.

In an embodiment of the invention there is provided an irrigation pipe formed from a sheet that is rolled into a tube about a longitudinal axis, the sheet comprising a fabric layer and an outer layer formed on the fabric layer, wherein the pipe comprises axially extending load bearing members extending in contact with the outer layer.

Possibly, the load bearing members extend at least partially within the outer layer. This may be the case where e.g. the outer layer is in the form of a coating formed on the fabric layer. Possibly in this case the axial members during production are first placed, preferably under tension, upon the fabric layer and then the coating may be applied.

Possibly, the load bearing members extend between the fabric layer and the outer layer. This may be the case where optionally the outer layer is in the form of a film (possibly pre-formed film layer) that is placed upon the fabric, possibly while being heat bonded to the fabric layer (and members) thereby capturing or sandwiching the axial member between the outer and fabric layers. Such embodiment where the load bearing members extend between the fabric layer and the outer layer may nevertheless also be the outcome of a coating outer layer that is formed/coated upon the fabric layer.

Preferably, each load bearing member comprises filaments that are sized. Such sizing may be for enhancing bonding to the material of the outer layer of fabric layer, while in addition or alternatively the outer layer may include a coupling agent to assist is such bonding of the axial members to the outer layer and/or fabric layer.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1A:
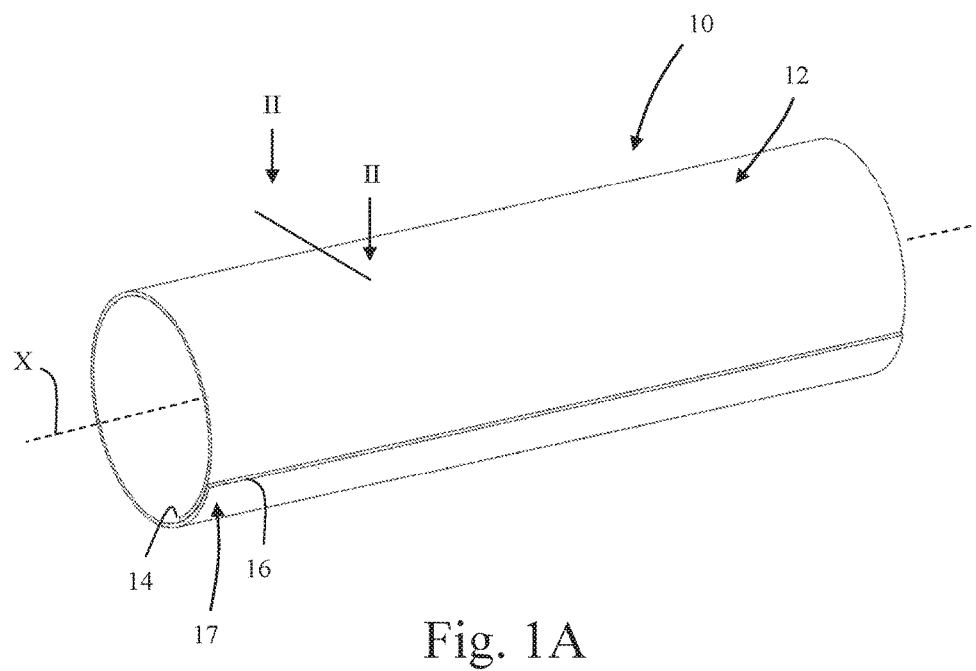
FIGS. 1A and 1B schematically show, respectively, perspective views of a pipe and a sheet forming the pipe, in accordance with an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 1B:
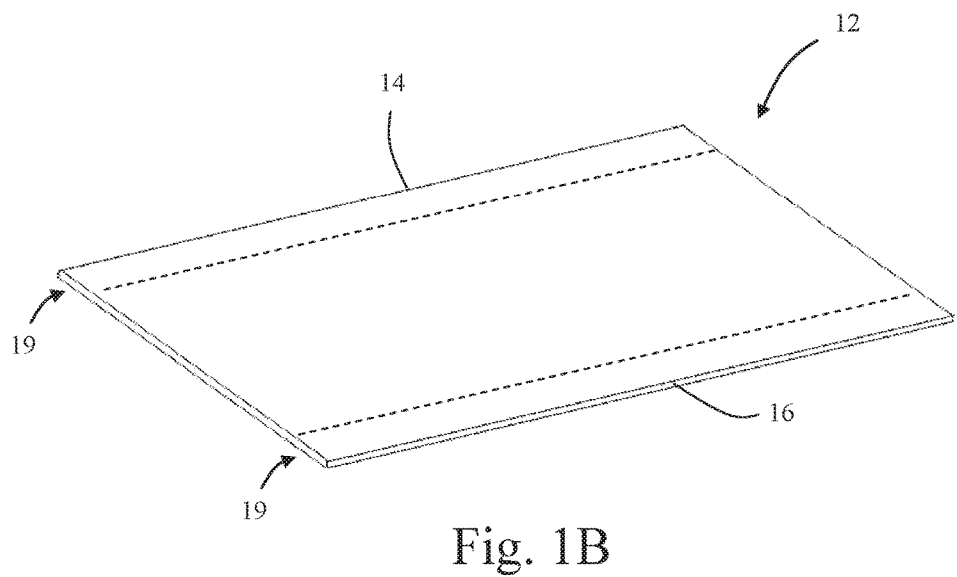

Attention is initially drawn to FIGS. 1A and 1B. FIG. 1A schematically shows a flexible pipe 10 for transporting a fluid, in accordance with an embodiment of the invention, formed from a sheet 12 (seen also in FIG. 1B) that is suitable for use in forming the pipe. For convenience of presentation, sheet 12 is schematically shown as being appropriately cut to form an irrigation pipe in accordance with an embodiment of the invention and has two longitudinal edges 14 and 16 parallel to axis X of the pipe that laterally bound the sheet. Sheet 12 in addition may be defined as having lateral margins 19 that extend each along a respective one of the edges 11, 16.

Irrigation pipe 10 may be formed by folding sheet 12 onto itself and about axis X to bring the lateral margins 19 to overlap each other to provide an overlap region 17 bounded by edges 14 and 16. The margin 19 forming the outer side of region 17 (in a direction out of the pipe) may be defined as an "outer margin" and the margin 19 forming the inner side of region 17 (in a direction into the pipe) may be defined as an "inner margin". After overlapping "outer margin" upon "inner margin", overlap region 17 may be bonded and/or welded by bonding and/or welding the edges 14, 16 and/or the margins 19 one to the other to form the pipe.

Any of various irrigation accessories, such as lateral connectors for connecting lateral pipe branches, sprinklers, anti-drip valves or pressure regulators (and the like) may be attached to or incorporated into pipe 10 using a method, such as heat welding, bonding or molding, known in the art. Optionally, pipe 10 is of a collapsible type which when not in use under fluid pressure has a shape of a generally flat strip (not shown). In agricultural use, such collapsible pipes when laid upon the ground of a field can exhibit endurance to overriding by wheeled vehicles, which may enter the field between irrigation cycles and may be easily installed and/or removed from a field.

Figure 2A:
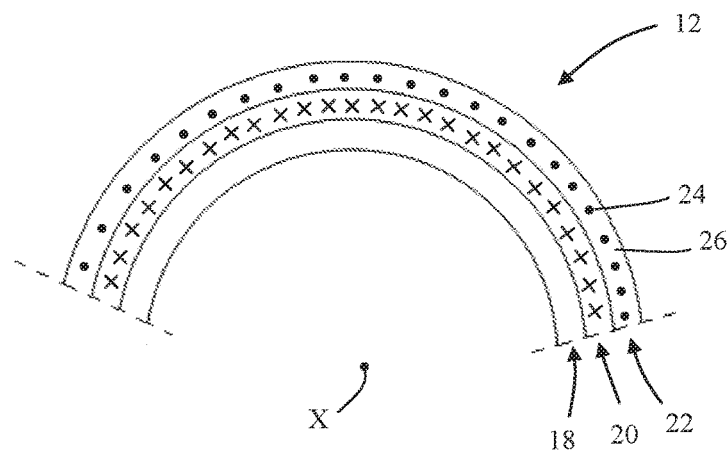
FIGS. 2A to 2D respectively show partial possible cross sections of the pipe taken in plane II-II in FIG. 1A.

With attention drawn to FIG. 2A an embodiment of sheet 12 and a possible multilayer structure of sheet 12 are schematically shown. Sheet 12 may have an inner layer 18, a top outer layer 22 and a fabric layer 20 therebetween. Inner layer 18, which in some embodiments may be formed from two or more sub-layers, may be (or include) a water-tight polymeric layer film and/or coating for preventing or substantially limiting fluid (e.g. irrigation liquids) from passing therethrough. Layer 18 may be made of polymeric materials such as Polyethylene, Polypropylene, COC, TPO, PVC, TPE. Optionally, the polymeric layer 18 is made of polymer produced by Metallocene polymerization. Possibly, layer 18 may be made and/or include a similar type polymer or polyolefin as included and/or existing in fabric layer 20 for improving bonding and/or attachment between the layer 18 and the fabric layer 20.

The fabric layer 20 may be made of any suitable fabric or mesh material suitable for enhancing tear resistance, durability and/or generally improved structural integrity and resistance to stress generated by pressure of the liquids the pipe transports. In an embodiment, fabric layer 20 may include polymer or polyolefin fibers (such as Polypropylene or Polyethylene) possibly woven in circumferential and longitudinal directions, however any other arrangement of material and/or orientation of fibers may be suitable for pipe 10.

Outer layer 22 may be in the form of a film and/or coating applied and/or laid upon fabric layer 20 and including and/or overlying axially extending load bearing members 24. Preferably, layer 22 is made and/or includes a similar type polymer or polyolefin as included or existing in fabric layer 20 for improving bonding and/or attachment of layer 22 to fabric layer 20.

In the embodiment seen in the figures, layer 22 is shown formed or including a coating marked by numeral 26 and the load bearing members 24 in this embodiment may be at least partially located within the coating possibly at least partially bonded and/or welded to the coating. In the embodiment (not shown) where outer layer 22 is applied as a film upon the fabric layer 20, the load bearing members 24 may be located between the fabric layer and the outer layer in contact with the film and possibly at least partially bonded and/or welded to the film.

By way of example, for a fabric layer 20 formed of, or including Polypropylene, layer 22 may be a co-polymer Polypropylene possibly with additives to assist bonding to fabric layer 20 and or improve properties of the material. And in an example in which fabric layer 20 is formed or includes Polyethylene, layer 22 may be formed and/or include Polyethylene, possibly Polyethylene grades such as Low-density polyethylene (LDPE), Linear low-density polyethylene (LLDPE), Medium density polyethylene (HDPE) or High Density polyethylene(HDPE), (etc.).

In an embodiment of the invention, the axial members 24 may be formed as filaments that are sized (coated) and then possibly individual filaments are bundled in large numbers to provide a roving. Possibly such "bundle" may have a lateral width (e.g. diameter if substantially circular in cross section) of about 2 to 4 millimeters in one exemplary case. In a preferred embodiment, axial members 24 may comprise and/or include glass fiber filaments and the size (filament coating) may be starch.

In order to increase bonding between the fibers and the outer layer the fibers may be provided with surface coating (size). Preferably the size (filament coating) is chosen to assist bonding to the outer layer 22. In an embodiment where the outer layer is or includes Polypropylene, sizing by e.g. silanes, (such as amino silane) or starch may assist in bonding between the filaments to the Polypropylene material of the outer layer.

Further improvement of the bonding between the fibers and the outer polymeric layer, may be obtained by inclusion of a coupling agent such as PP grafted with maleic anhydride (MaPP) as possibly an additive within the outer layer 22. Inclusion of such coupling agents may increase the thermal stability of the fiber reinforced layer. In an embodiment where the outer layer is or includes Polyethylene, the inclusion of coupling agent such as PE grafted with Maleic anhydride (MaPE) may assist in bonding between the filaments to the Polyethylene material of the outer layer.

In other embodiments, the axial members may comprise and/or include carbon or basalt. In accordance with an aspect of the invention, the axial members 24 coupled and/or attached to fabric layer 20 by outer layer 22 assist in preventing elongation of pipe 10 during use by resisting longitudinal stress and consequently reducing longitudinal strain in the pipe.

Figure 2B:
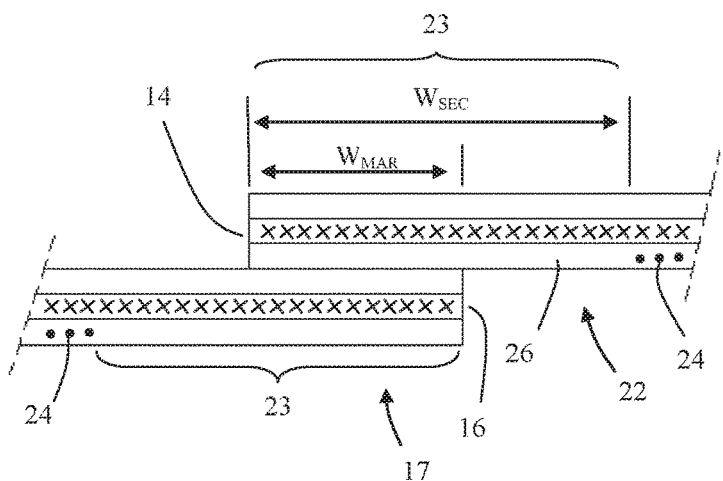
Figure 2C:
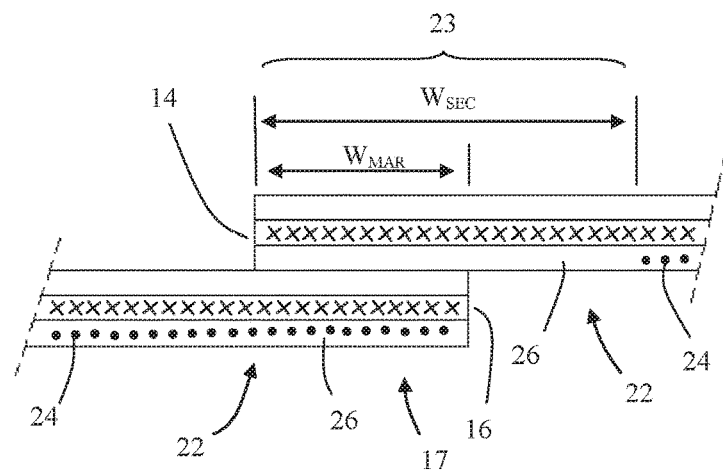

With attention drawn to FIGS. 2B and 2C, embodiments of the present invention are schematically shown in a vicinity of overlap region 17. In some cases it may be preferable to avoid having axial members 24 in the area of region 17 in order to avoid possible harm to the bonding of the pipe in this region, since existence of the members 24 (e.g. glass) within the weld of region 17 may in some cases reduce the strength of the weld.

In one embodiment shown in FIG. 2B, in an area adjacent region 17, sheet 12 may include in outer layer 22 sections 23 extending along the edges 14, 16 that are formed lacking axial members 24. Possibly, a lateral width $W_{SEC}$ of section 23, as measured from a longitudinal edge 14, 16 to a center of a closest member 24 to said longitudinal edge, may be greater than a lateral width by $W_{MAR}$ of the margins 19 forming region 17.

In the embodiment shown in FIG. 2B a further aspect can be seen being the symmetrical distribution of section 23 in the outer layer 22 of sheet 12 along both longitudinal edges 14 and 16. Such symmetrical distribution may be preferable for practical processing efficiency. With attention drawn to FIG. 2C a further embodiment may be seen where section 23 lacking the axial members 24 is present in a non-symmetrical manner only in a "segment" of outer layer 22 belonging to the "inner margin" of sheet 12, since outer layer 22 only in or within this "segment" may be subjected to bonding and/or welding when forming the pipe.

To ensure lack of presence of axial members 24 in or adjacent region 17, the width $W_{SEC}$ of section 23 lacking the members 24 and the width $W_{MAR}$ of the margin 19 designed to form region 17 may be set to satisfy a relationship of $W_{SEC}/W_{MAR} \leq 1.6$, and optionally $W_{SEC}/W_{MAR} \leq 1.2$ and further optionally $W_{SEC}/W_{MAR} \leq 1.15$.

A larger ratio of $W_{SEC}/W_{MAR}$ may assist e.g. in providing a larger "safety net" to ensure that axial members 24 won't be present within or adjacent region 17 also in cases where e.g. production accuracy is smaller consequently forming a pipe with a lateral width of region 17 that is larger than intended. A smaller ratio of $W_{SEC}/W_{MAR}$ may ensure e.g. presence of axial members 24 about a larger circumference of the pipe to resist axial lengthening, while still not present in or adjacent region 17. This may be the case chosen where e.g. higher production accuracy is available in the forming of region 17 of the pipe so it is produced closer to its intended lateral width.

Figure 2D:
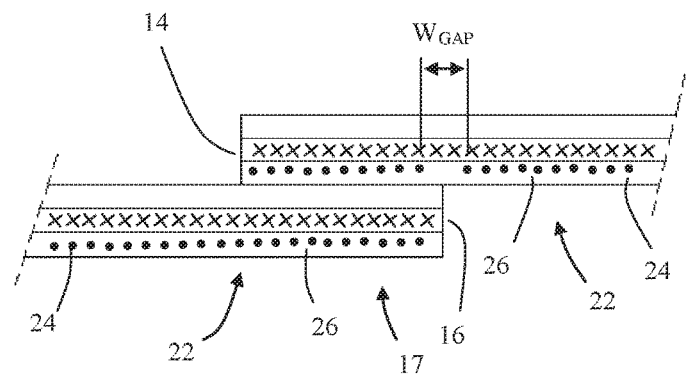

With attention drawn to FIG. 2D a further embodiment is shown in which a "gap" is present where axial members 24, here optionally one member 24, are absent in the outer layer 22 of the "inner margin". This "gap" may be located adjacent where the longitudinal edge (here 16) of the "outer margin" is located after forming overlap region 17. A lateral width $W_{GAP}$ of this "gap" may optionally be ≥5 millimeter and further optionally ≥10 millimeter (while possibly not exceeding 20 millimeters) to ensure a zone free of members 24 adjacent where the longitudinal edge (here 16) of "outer margin" is bonded to the "inner margin". This may reduce likelihood of "peeling off" of the "outer margin" from the "inner margin" due to weak bonding at the longitudinal edge (here 16) because of presence of member(s) 24 in the outer layer of the "inner margin" that may have interfered in the bonding. Typically $W_{GAP}$ may be measured between centers of adjacent member 24.

Figure 3:
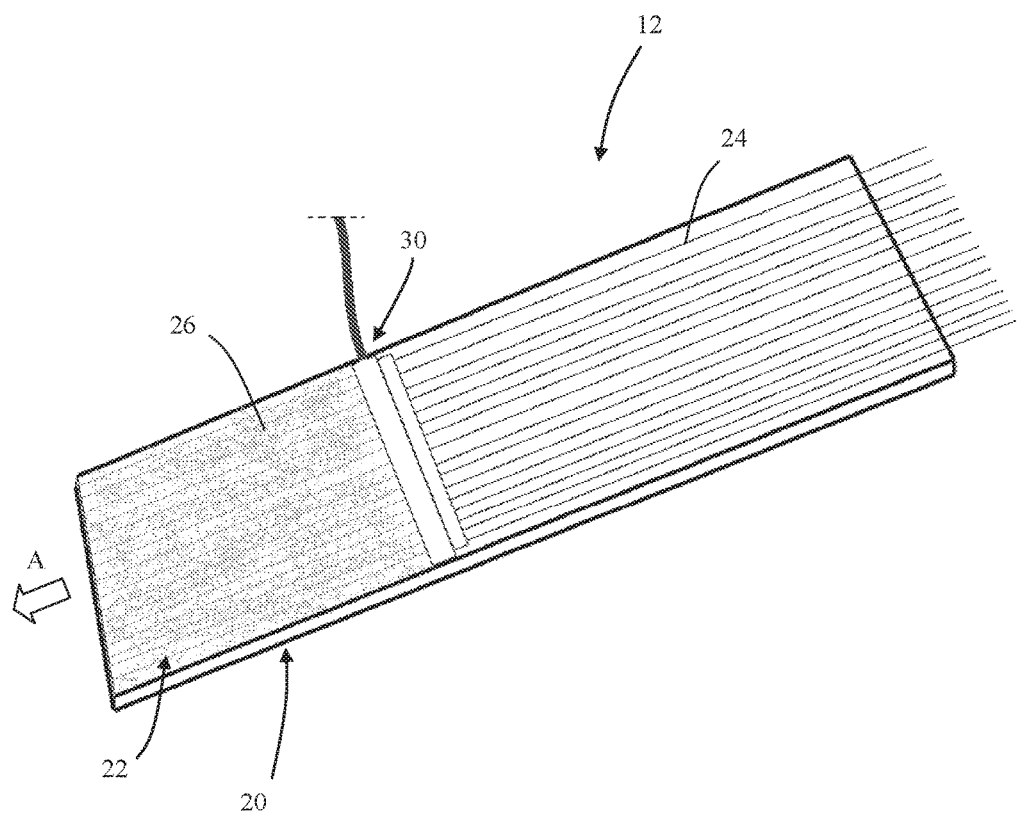
FIG. 3 schematically shows an embodiment of a production phase of a sheet that may be used for forming a pipe.

With attention drawn to FIG. 3, an embodiment of a possible production scheme for forming material to be used as sheet 12 is schematically shown, while it is noted that in the shown embodiment outer layer 22 is in the optional form of a coating. It is to be understood that the material being formed may be of a relatively long extension at this production stage, while schematically shown is only a portion of this material.

In an embodiment, fabric layer 20, with or without inner layer or inner sub-layers, may be advanced in direction A within a production line. In same production line a plurality of axial members 24 are configured to extend above fabric layer 20 and be advanced also in direction A. Layer 20 and axial members 24 pass by an extruding station 30 where hot melted material for forming coating 26 may be applied upon the advancing layer 20 and members 24 for coating layer 20 and by that bonding and/or coupling the members 24 within coating 26 to the fabric layer.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Further more, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology; and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

The invention claimed is:

1. An irrigation pipe formed from a sheet that is rolled into a tube about a longitudinal axis, the sheet comprising a fabric layer and an outer layer formed on the fabric layer, wherein the pipe comprises axially extending load bearing members extending in contact with the outer layer, wherein:

the sheet is laterally bound between two longitudinal edges and comprises lateral margins extending along the edges, wherein the rolling of the sheet to form the tube comprises overlapping the lateral margins to form an overlap region; and the sheet at least in the vicinity of the overlap region lacks load bearing members.

2. The pipe according to claim 1, wherein the load bearing members extend at least partially within the outer layer.

3. The pipe according to claim 1, wherein the outer layer is a coating formed on the fabric layer.

4. The pipe according to claim 1, wherein the load bearing members extend between the fabric layer and the outer layer.

5. The pipe according to claim 1, wherein the outer layer is a film formed on the fabric layer.

6. The pipe according to claim 1, wherein the load bearing members are distributed about the axis.

7. The pipe according to claim 1, wherein each load bearing member comprises filaments that are sized.

8. The pipe according to claim 7, wherein the filaments of each member are bundled to provide a roving.

9. The pipe according to claim 7, wherein the filaments are glass fiber.

10. An irrigation pipe formed from a sheet that is rolled into a tube about a longitudinal axis, the sheet comprising a fabric layer and an outer layer formed on the fabric layer, wherein the pipe comprises axially extending load bearing members extending in contact with the outer layer, wherein:
the sheet is laterally bound between two longitudinal edges and comprises lateral margins extending along the edges, wherein the rolling of the sheet to form the tube comprises overlapping the lateral margins to form an overlap region; and
a lateral width of each margin is $W_{MAR}$ and the sheet comprises a section in the outer layer extending along at least one of the longitudinal edges that lacks load bearing members and has a lateral width $W_{SEC}$, wherein $W_{SEC}/W_{MAR} \leq 1.6$.

11. The pipe according to claim 1, wherein the load bearing members extend continuously along the length of the pipe.

12. The pipe according to claim 1, wherein the load bearing members are at least partially bonded to the fabric layer by the outer layer.

13. An irrigation pipe having a longitudinal axis, comprising:
a sheet having a pair of longitudinal edges and lateral margins extending along the longitudinal edges, the sheet being rolled into a tube about said longitudinal axis with the lateral margins overlapped to form an overlap region which extends along a length of the irrigation pipe, wherein:
the sheet comprises;
a fabric layer;
an outer layer provided over the fabric layer; and
a plurality of axially extending load bearing members in contact with the outer layer; and
the sheet, at least in the vicinity of the overlap region, lacks load bearing members.

14. The irrigation pipe according to claim 13, wherein:
the sheet lacks load bearing members along both lateral margins.

15. The irrigation pipe according to claim 14, wherein:
the sheet lacks load bearing members along sections which include, and extend beyond, corresponding lateral margins.

16. The irrigation pipe according to claim 15, wherein:
each lateral margin has a first lateral width $W_{MAR}$;
each section has second lateral width $W_{SEC}$; and
$W_{SEC}/W_{MAR} \leq 1.6$.

17. The irrigation pipe according to claim 16, wherein:
$W_{SEC}/W_{MAR} \leq 1.2$.

18. The irrigation pipe according to claim 13, wherein:
the sheet lacks load bearing members along only one of the lateral margins.

19. The irrigation pipe according to claim 18, wherein:
the sheet lacks load bearing members along a section which includes, and extends beyond, said only one lateral margin.

20. The irrigation pipe according to claim 19, wherein:
said only one lateral margin has a first lateral width $W_{MAR}$;
said section has second lateral width $W_{SEC}$; and
$W_{SEC}/W_{MAR} \leq 1.6$.

21. The irrigation pipe according to claim 20, wherein:
$W_{SEC}/W_{MAR} \leq 1.2$.

22. The irrigation pipe according to claim 13, wherein:
the sheet lacks load bearing members only along a gap located a distance from a first of the two longitudinal edges; and
the gap is positioned adjacent where a second of the two longitudinal edges is located after forming the overlap region.

23. The pipe according to claim 1, wherein:
the fabric layer comprises a polymer or polyolefin; and
the outer layer comprise the same polymer or polyolefin as the fabric layer.

* * * * *